No. 684,355. Patented Oct. 8, 1901.
H. B. DIERDORFF.
MINING MACHINE.
(Application filed Nov. 20, 1895.)

(No Model.) 5 Sheets—Sheet 1.

Witnesses:
J. W. Coleman
Wm. H. Edwards

Inventor:
Henry B. Dierdorff
By H. H. Bliss
Atty

No. 684,355. Patented Oct. 8, 1901.
H. B. DIERDORFF.
MINING MACHINE.
(Application filed Nov. 20, 1895.)
(No Model.) 5 Sheets—Sheet 2.
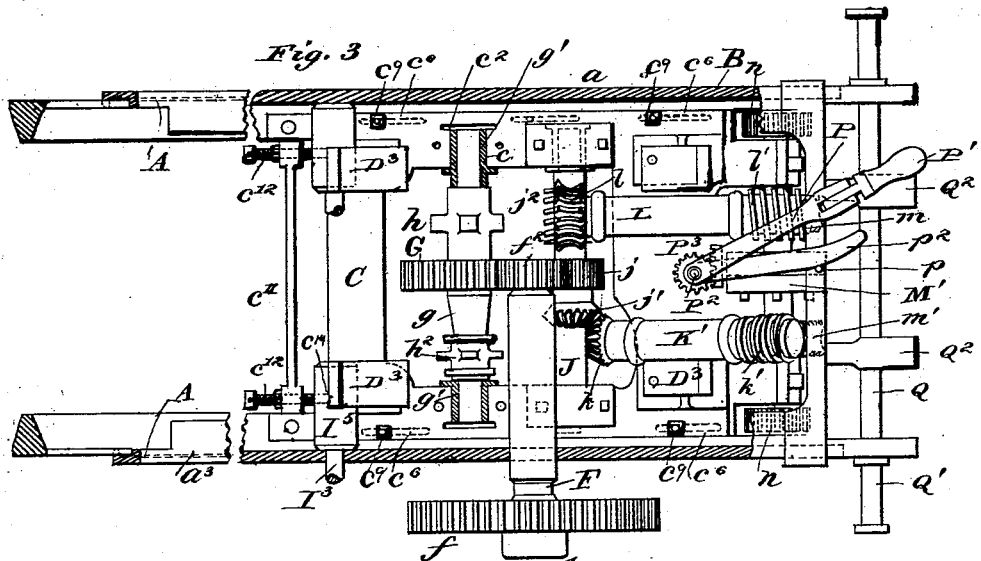
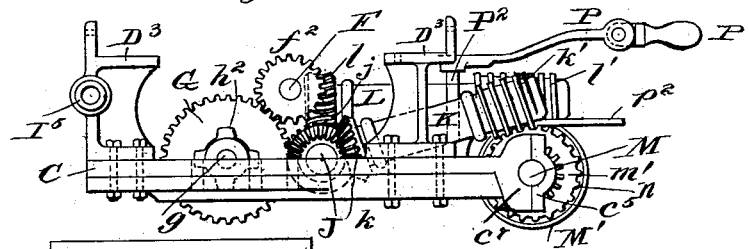
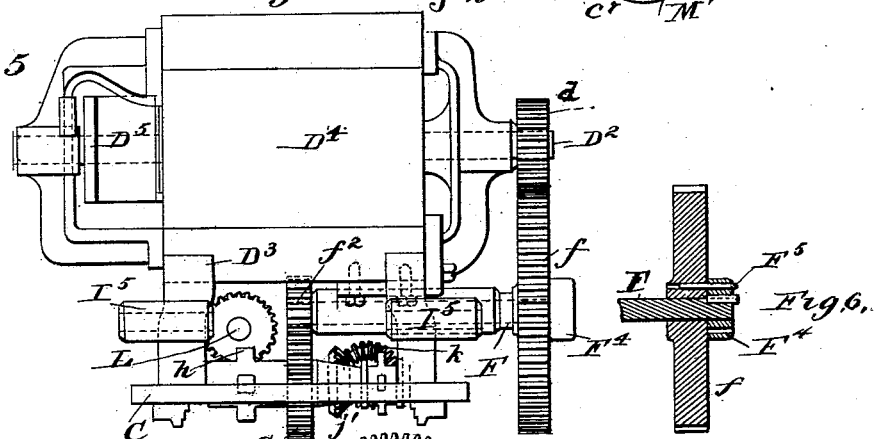
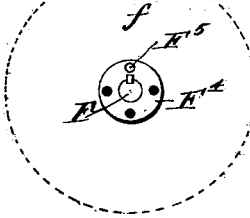
Witnesses;
Inventor
Henry B. Dierdorff
By N. H. Bliss
Atty.
THE NORRIS PETERS CO., PHOTO-LITHO., WASHINGTON, D. C.

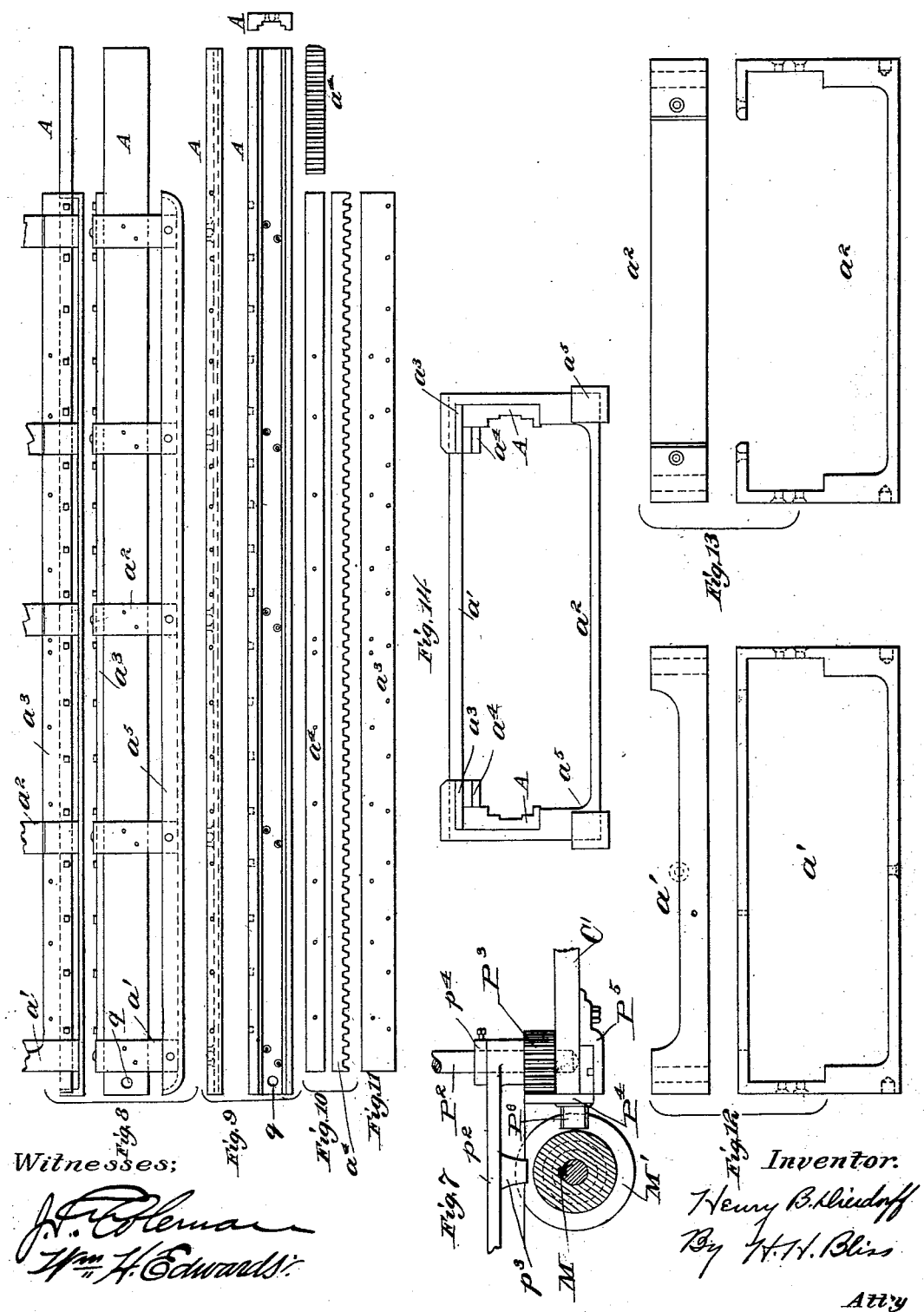

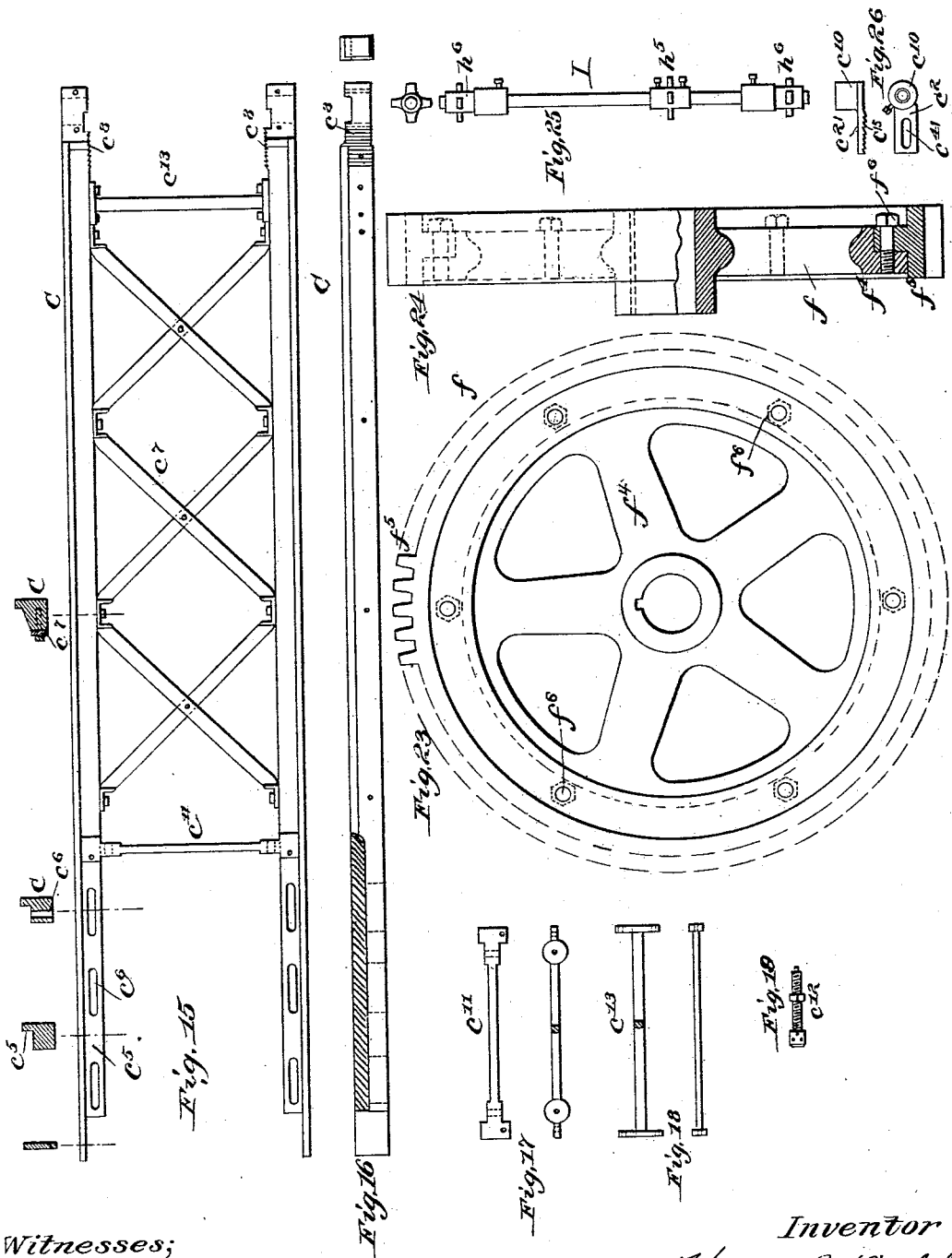

No. 684,355. Patented Oct. 8, 1901.
H. B. DIERDORFF.
MINING MACHINE.
(Application filed Nov. 20, 1895.)
(No Model.) 5 Sheets—Sheet 5.
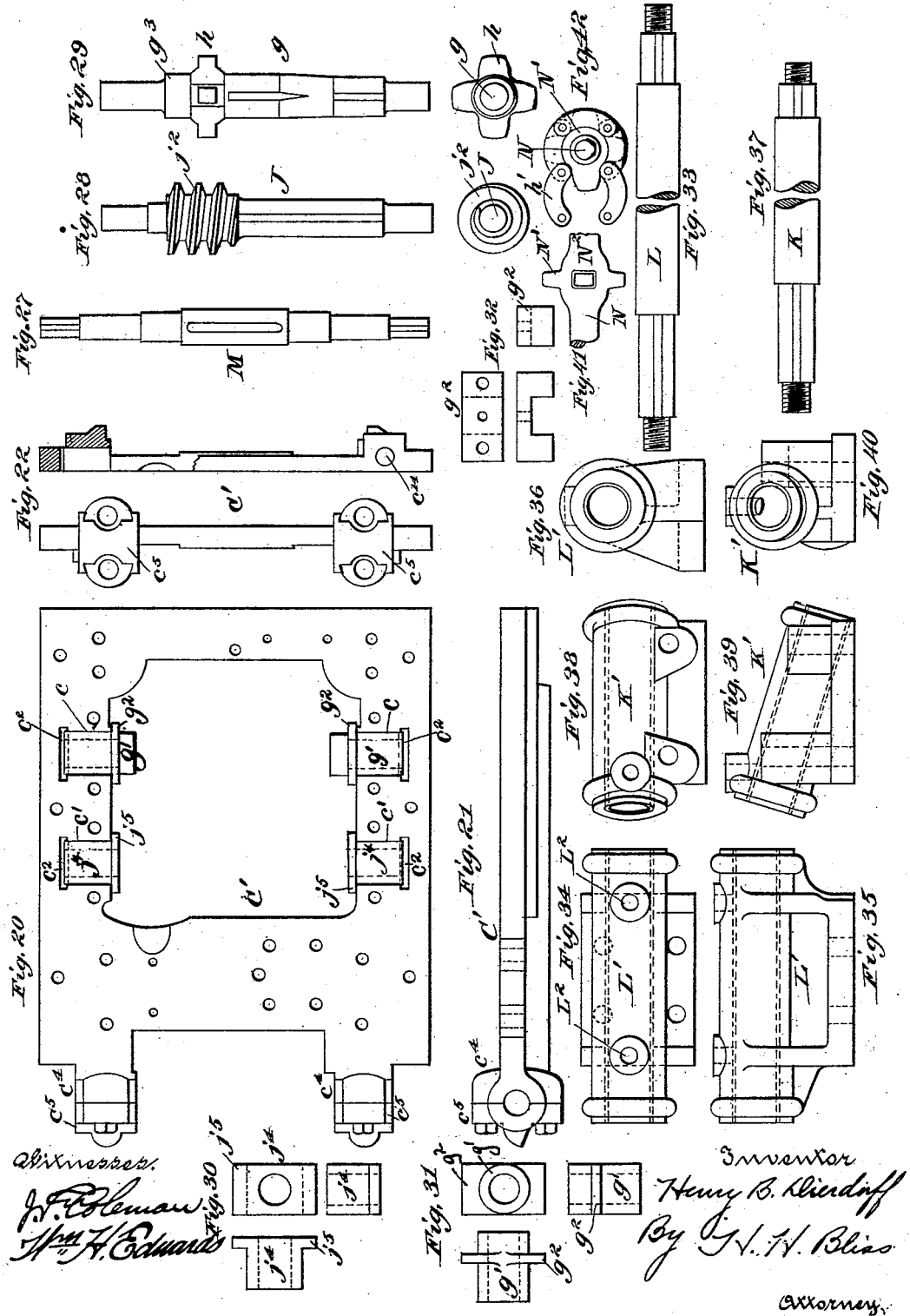
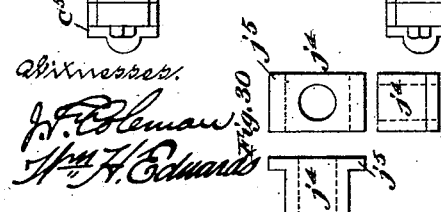

UNITED STATES PATENT OFFICE.

HENRY B. DIERDORFF, OF COLUMBUS, OHIO, ASSIGNOR TO JOSEPH A. JEFFREY, OF SAME PLACE.

MINING-MACHINE.

SPECIFICATION forming part of Letters Patent No. 684,355, dated October 8, 1901.

Original application filed June 27, 1891, Serial No. 397,712. Divided and this application filed November 20, 1895. Serial No. 569,484. (No model.)

*To all whom it may concern:*

Be it known that I, HENRY B. DIERDORFF, a citizen of the United States, residing at Columbus, in the county of Franklin and State of Ohio, have invented certain new and useful Improvements in Mining-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in electric mining-machines of the class in which a cutter-bar is forced transversely into the coal, in combination with means for effecting a slow advance of the cutter-bar and a rapid withdrawal of it.

It consists in providing such a machine with such power mechanism, power-transmitting devices, and such details of construction and arrangement of parts that I am enabled to present a machine not only more desirable than those heretofore used, but one which is more efficient, compact, and of greater capabilities as to cutting coal.

Figure 1:
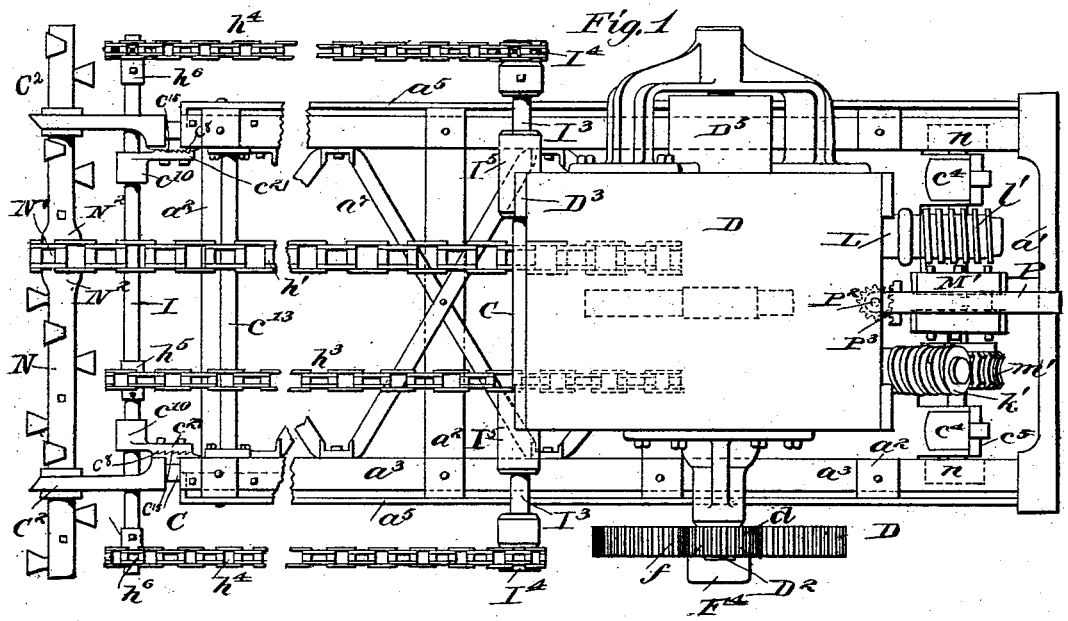
Figure 2:
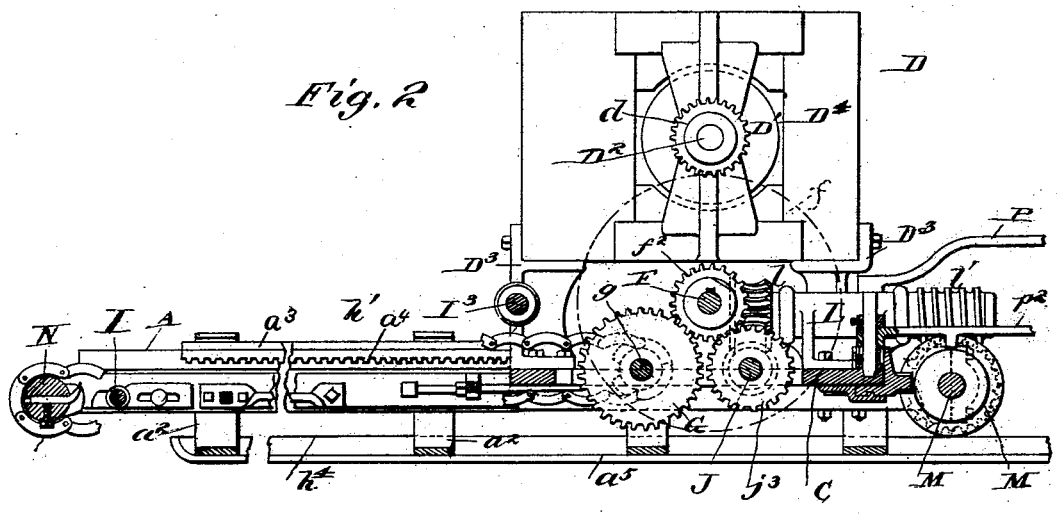

In the drawings, Figure 1 is a plan view of the machine, parts being broken away so as to shorten it longitudinally. Fig. 2 is a partial longitudinal section through the same. Fig. 3 is a plan view of the machine with the motor removed, showing the gearing. Fig. 4 is a side view of the carriage-platform and the gearing mounted thereon. Fig. 5 is an end view of the same. Figs. 6 and 6$^a$ show in section and in face view the wheel engaged by the armature-pinion. Fig. 7 shows the clutch-shifting devices at the rear of the carriage. Figs. 8 to 14 show details of the bed-frame, in which Fig. 8 is a top and a side view of the one side of the bed-frame, the parts being assembled together. Fig. 9 is a top and a side view of one of the channel-bars. Fig. 10 is a top and a side view of one of the rack-bars. Fig. 11 is a plan view of the top plate. Fig. 12 is a top and a side view of the rear cross-brace. Fig. 13 shows one of the front cross-braces; and Fig. 14 is a rear view of the bed-frame,
with the channel-bars, rack-bars, and other parts in position. Fig. 15 is a plan view of the carriage-frame. Fig. 16 is a side view of the same. Figs. 17 and 18 show, respectively, the rear and the front cross connecting-bars. Fig. 19 shows one of the platform-adjusting screws. Fig. 20 is a plan view of the carriage plate or platform. Fig. 21 is a side view of the same. Fig. 22 shows a rear view and a partial cross-section of the same. Figs. 23 and 24 show a modified form of wheel driven by the armature-pinion. Fig. 25 shows the cleaner-chain shaft. Fig. 26 shows one of the bearings for the same. Fig. 27 shows the reversible carriage-moving shaft, and Fig. 28 shows the cross-shaft from which power is received to drive the same. Fig. 29 shows the chain-driving shaft. Fig. 30 shows one of the bearing-boxes for the cross power-shaft. Fig. 31 shows the bearing-boxes for the chain-shaft. Fig. 32 shows the form of cap used to bolt the boxes in place. Fig. 33 shows the carriage-advancing shaft. Figs. 34, 35, and 36 show the bearing for the same. Fig. 37 shows the carriage-recede shaft, and Figs. 38, 39, and 40 show the bearing therefor. Fig. 41 shows the portion of the cutter-bar with the chain-wheel; and Fig. 42 is a side view of the cutter-bar, showing the chain for driving it.

Referring to the drawings, the bed-frame is composed of side channel or guide bars A A, connected by front cross-brace $a^2$ $a^2$ and a rear cross-brace $a'$. Bolted to the side bars are top bars $a^3$, which support rack-bars $a^4$ $a^4$. The front cross-braces are open at the top, while that at the rear is connected by a cross-bar. (See Figs. 12 and 13.) The bed-frame is supported upon shoes, by means of which it can be moved and which also form a solid base to prevent the cross-braces from sinking into the mud at the floor of the mine.

Mounted upon and sliding in the grooves of side bars A is the carriage-frame, having forwardly-projecting side bars C C, joined together by front and rear cross-girths $c^{13}$ $c^{11}$ and intermediate braces $c^7$. At the rear end the bars are cut away, as at $c^5$, so as to support a plate or platform C'. This platform is bolted to the bars, the bolts passing through elongated slots $c^6$, whereby the plate can be adjusted longitudinally on the bars by means of adjusting-screws $c^{12}$, passing through rear cross-braces $c^{11}$ and bearing against the plate at $c^{14}$. It has an open center to accommodate the gearing to be hereinafter described and is formed with rearwardly-extending arms $c^4$, which, together with the caps $c^5$, form bearings for a cross-shaft, which will also be described. The plate is formed with square sockets $c\ c\ c'\ c'$, which terminate in slots $c^2$. It has on its bottom face longitudinal strengthening-ribs, and the adjusting-screws $c^{12}$ rest in sockets at $c^{14}$, which are formed in the plate at the forward ends of the said ribs. There is a supplemental rib extending forward from the bearings at the ends of arms $c^4$ to provide sufficient strength to withstand the powerful vertical thrust which the arms experience.

At the forward ends of the carriage-bars is supported the cutter-bar N. It is mounted in shoes $C^2$, bolted to the ends of carriage-bars C, and is formed with a wheel N', being swelled or thickened on either side of the wheel, as at $N^2 N^2$. Cutters are secured to it in any of the well-known ways and are arranged so as to cut a kerf of sufficient size to allow the forward part of the carriage-frame to enter it.

In the rear of the cutter-bar the cleaner-chain shaft I is supported on the carriage-bars C by means of brackets $c^{21}$, bolted thereto and provided with bearings $c^{10}$. The brackets have cross-serrations $c^{15}$, engaging with similar serrations $c^8$ on the side of the bars C, and may be adjusted relatively to said bars by reason of the elongated slots $c^{41}$, through which the fastening-bolt passes. On the shaft I are mounted sprocket-wheels $h^5\ h^6\ h^6$.

The cutter-bar is actuated by means of the following devices: An electric motor (indicated as a whole by D) is mounted upon brackets or standards $D^3$, bolted to the carriage-plate C'. The motor has the ordinary armature D', commutator $D^5$, field-cores $D^4$, and armature-shaft $D^2$. Upon the end of the armature-shaft $D^2$ is a pinion $d$, which gears with a large wheel $f$, mounted upon a short shaft F, mounted in a tubular bearing beneath the motor. The wheel $f$ is mounted upon the shaft F in such a way that when the cutters strike some such extraordinarily hard substance that they are stopped from rotating the wheel will be allowed to rotate freely on the shaft without breaking or destroying any of the parts of the machine—that is to say, the wheel $f$ is loose upon shaft F, but is secured thereto by means of pin $F^5$, extending into a passage or opening formed in the wheel and into an alined passage in a collar $F^4$, keyed to the shaft. The shaft F has keyed upon its inner end a pinion $f^2$, which engages with and drives a relatively larger pinion G, mounted upon what I term the "chain-shaft" $g$. These pinions and wheels $d$, $f$, and $f^2$ and G constitute the slowing-down gearing to actuate the cutters at a number of revolutions very much less than that of the armature-shaft. The chain-shaft $g$ is formed with a chain-wheel $h$ and has keyed to it another sprocket-wheel $h^2$ for driving the cleaner-chains. It is mounted in boxes $g'$, which fit in the square cavities $c\ c$ in the carriage-plate and which are held in place by caps $g^2\ g^2$. Extending from the chain-wheel $h$ on shaft $g$ is a drive-chain $h'$, engaging with the sprocket-wheel N', formed on the cutter-bar N. The links of the chain are curved, the curve of the lower edge of each link being equal to one-quarter of the periphery of sprocket-wheel N' at the base of its teeth.

The cleaner-chain shaft I is actuated by means of a chain $h^3$, driven by the chain-wheel $h^2$ on shaft $g$ and engaging with the sprocket-wheel $h^5$ thereon. Extending rearward from the projecting ends of shaft I are two cleaner-chains $h^4\ h^4$, supported at the rear upon sprocket-wheels $I^4$, carried by studs $I^3 I^3$, which are mounted in bearings $I^5$ on the forward standards $D^3$.

When the cutter-bar is rotated and is being advanced into the coal, the cleaner-chain will drag along the floor of the kerf and withdraw the cuttings therefrom.

I will now describe the carriage advancing and withdrawing mechanism.

Mounted in boxes $j^4 j^4$, fitting in the square sockets $c'\ c'$ of the carriage-plate C, is a shaft J, which has cut upon it a worm $j^2$ and has keyed to it a bevel-wheel $j'$ and a spur-wheel $j$, the latter being driven by wheel G on the shaft $g$.

L is a longitudinally-arranged shaft mounted in a tubular bracket L', bolted to the carriage-plate C. This tubular bracket (seen in detail in Figs. 34, 35, and 36) is provided with a standard and a flat support or base and has oil-ducts at $L^2$, communicating with the interior. The shaft L is screw-threaded at each end to receive a worm-wheel driven by worm $j^2$ on shaft J and a worm $l'$, which engages with and drives a worm-wheel $m$ on a cross-shaft M.

K is another longitudinally-arranged shaft, mounted in tubular bracket K', bolted to plate C, and has upon one end a bevel-wheel $k$, driven by bevel-wheel $j'$ on the shaft J. On the other end it is provided with a worm $k'$, which drives a worm-wheel $m'$ on the said shaft M. Both the worm-wheels $m\ m'$ are loose upon shaft M, which latter is mounted upon the arms $c^4\ c^4$ of the carriage-plate C, being held in place by the caps $c^5\ c^5$. The worm-wheels $m\ m'$ are also driven in different directions and with different speeds, wheel $m$ being rotated rapidly by reason of the bevel-wheels $j\ k$ and wheel $m'$ being rotated slowly in the other direction by means of the worm $j^2$ and wheel $l$. Each worm $m\ m'$ is continually rotating and is provided with holes or apertures to receive the pins of a clutch M', keyed to shaft M and adapted to slide longitudinally thereon. Thus it will be seen that this shaft, which I term the "carriage-moving shaft," is driven in one direction or the other as the clutch is in engagement with wheel $m$ or wheel $m'$. At each end the shaft M is provided with a rack-pinion $n$, which engages with the racks $a^4 a^4$, depending from the bars $a^3 a^3$ of the side bars A. When the clutch is in engagement with the worm-wheel $m$, the shaft M is rotated in a rearward direction, and the pinions $n$, engaging with the rack-bars $a^4$ of the stationary bed, force the carriage and the cutter-bar slowly into the coal. When the cutter-bar has cut a kerf of sufficient length, the clutch is shifted into engagement with wheel $m'$ and the shaft M is reversely rotated and the carriage is rapidly withdrawn. When the clutch-pins are engaged in the holes in the worm-wheels $m\ m'$, it requires great power to withdraw them, so that I am obliged to use power devices to accomplish this.

At the rear of the carriage I mount a vertical shaft $P^2$, which carries a pinion $P^3$. The latter engages with a rack-plate $P^4$, sliding in a guide-plate $P^5$, bolted to the under side of the carriage-plate C, said rack-plate having a stud or projection entering the circumferential groove of the clutch M'. At the upper end of shaft $P^2$ is keyed a rearwardly-extending lever P, with a pivoted handle P', by means of which the pinion $P^3$ is rotated to shift the rack-plate $P^4$. In order to insure that the clutch shall be shifted from engagement with worm-wheel $m'$ when the carriage is being withdrawn, I mount loosely upon shaft $P^2$ a lever $p^2$, curved slightly to one side at the rear and having secured to it a depending lug or projection $p^3$, lying in the groove of clutch M'. The lever is held in place by a collar $p^4$, secured by a set-screw to shaft $P^2$. When the carriage has almost reached its rearmost position, the curved end of lever $p^2$ engages with a cam $p$, mounted on the rear cross-brace $a'$ of the bed, and is forced to one side, disengaging the clutch from wheel $m'$ and throwing it into a neutral position.

In order to assist in moving the machine from place to place in the mines, I provide at the rear thereof a cross-bar Q, mounted in apertures $q$ (see Fig. 8) in the side bars A and extending laterally therefrom to form handles Q' Q'. Supplemental horns or handles $Q^2 Q^2$ are also provided and extend rearwardly from the rear cross-bar $a'$, to which they are bolted.

It will be seen by examination of the drawings that I have shown nearly all the various parts of the machine in detail, one sheet showing the bed-frame and its carriage-frame and another the carriage-plate, with the parts that are bolted thereto.

Two styles of boxings $g'$ and $j^4$ are shown, one for one end of shaft $g$ and the other for shaft J. The box $j^4$ has the lateral flanges $j^5$, which bear against the carriage-plate at the end, while the box $g'$ is extended beyond the flanges $g^2$ to provide a longer bearing and abut against the shoulder $g^3$ of shaft $g$. The boxes do not extend all the way in the sockets $c\ c'$ of plate C, but leave an open space $c^2$, through which oil-drippings and grit may drop through the slots $c^2$ to the floor of the mine.

The cutter-bar is shown in detail in Figs. 41 and 42. As said, it is considerably enlarged at $N^2$, where the chain $h'$ engages, the boundary-lines in cross-section being curvilinear and the longitudinal lines at the base of the teeth being also curvilinear—that is to say, the surface of the thickened part of the bar in proximity to the teeth is circular and is gradually reduced away from the tooth. Heretofore the bar (the bases of the teeth) has been square and has occasioned great trouble in manufacturing the bar; but the bar can be now turned out easily when once mounted in a lathe without the aid of a planing-machine, as was before required. The links are shaped, as has been said, to correspond to the bases of the teeth, the lower edges being curved to conform to the surfaces of the bar, the links encircling the latter when the parts are related, as shown.

In Figs. 23 and 24 I have shown a modified form of the wheel driven by the armature-pinion. In this construction the hub, the spokes, and a portion of the rim are in one casting $f^4$, to be keyed to the supporting-shaft, while the teeth are formed on a separate rim, which is bolted to the casting $f^4$ by means of bolts $f^6$. It will be seen that when the teeth become worn the rim $f^5$ can be removed and a new one substituted at very small cost.

I do not herein claim any of the matters claimed in my earlier application, Serial No. 397,712, filed June 27, 1891, of which the present case is a division.

What I claim is—

1. In a mining-machine, the combination of the following elements, namely, the stationary bed, the carriage sliding forward and back on the said bed, the cutting apparatus on the carriage arranged to operate at the front end thereof, and to be advanced directly forward into the coal, the carriage-moving devices on the bed, the counterpart carriage-moving devices on the carriage, the electric motor supported on the carriage and having a continuously-rotating armature and armature-shaft, said motor being arranged to provide a gearing space or chamber beneath said armature, a chain for actuating the cutters and extending from the front end of the carriage back into the said space or chamber beneath the armature, a chain-driving shaft at the rear end of the chain, the gearing in the said chamber or space beneath the motor and connected to the armature-shaft and to the chain-driving shaft, and means for connecting said gearing with the carriage-moving devices, the said parts being arranged substantially as described, whereby the power from the armature-shaft is taken directly downward to the parts in the said chamber or space beneath the motor, and imparted to the chain.

2. In a mining-machine, the combination of the bed, the carriage, the motor mounted on the carriage, the cutting apparatus moving bodily with the carriage and arranged to operate at the front end thereof and to be advanced bodily therewith relatively to the bed, the chain for actuating the cutters, and extending from the front end of the carriage back to points near the rear end thereof, the chain-driving shaft mounted on the carriage at the rear end, the electric motor secured to the carriage, and arranged to have below it a gearing chamber or space which contains the said chain-driving shaft, the continuously-revolving armature, gearing directly below the armature connecting the armature-shaft to the chain-driving shaft, a carriage-feeding mechanism having one member secured to the bed, and another member secured to the carriage, and means extending outward from the gearing chamber or space beneath the armature and backward to the outside thereof for actuating the carriage-moving mechanism, substantially as set forth.

3. In a mining-machine, the combination of the bed, the carriage, the cutting apparatus on the carriage, the chain actuating the cutters, the electric motor secured to the carriage and arranged to have under it a chamber or space for shafts and gearing, the chain-driving shaft in the said chamber under the motor, the intermediate shaft geared to the motor-armature and extending into the said chamber under the motor, and there connected by gearing to the chain-driving shaft whereby the motor incloses or covers said gearing, and the longitudinal dimensions of the carriage can be shortened, substantially as set forth.

4. In a mining-machine, the combination of the bed, the carriage, the cutting apparatus on the carriage, the electric motor secured to the carriage, with its armature-shaft situated transversely thereto, and arranged to have directly beneath it a chamber or space for gearing, the carriage-moving mechanism, the chain-driving shaft, the secondary shaft geared to the motor-armature and extending into said chamber, and geared beneath the motor for transmitting power from the secondary shaft to the chain-driving shaft and to the carriage-moving mechanism, substantially as set forth.

5. In a mining-machine, the combination of the bed, the carriage, the cutting apparatus on the carriage, the electric motor secured to the carriage and arranged to have a gearing chamber or space directly beneath it, a cutter-driving shaft below the motor in the said chamber or space, the carriage-moving shaft, the secondary shaft geared to the motor-shaft directly under the latter and extending into the said gearing-chamber, gearing below the motor connecting the secondary shaft with the chain-driving mechanism, and two trains of differently-speeded gear for transmitting power from the said secondary shaft to the carriage-moving mechanism, substantially as set forth.

6. The combination of the bed, the carriage, the cutting apparatus, the chain for actuating the cutting apparatus, the rear chain-driving shaft, the reversible feed-shaft, a shaft as at J intermediate of the chain-shaft, and the feeding-shaft, two intermediate trains of gearing between said shaft J and the feeding-shaft, the electric motor on the carriage and directly over said chain-shaft and shaft J, and a single train of gearing connected to the armature-shaft and connected to all of the aforesaid shafts supplemental to the amature-shaft, substantially as described.

7. The combination of the bed, the carriage, the cutting apparatus, the chain for driving said cutting apparatus, the reversible feed-shaft, a shaft as at J intermediate of the chain-shaft and the feed-shaft, the electric motor on the carriage directly over the said intermediate shaft and the chain-shaft, a wheel connected to the motor-shaft and the train of gearing extending directly downward from the motor-shaft to said intermediate shaft, all of said parts being driven by the last said wheel, substantially as set forth.

8. In a mining-machine, the combination of the bed, the carriage, the cutters, the chain for actuating the cutters, the chain-driving shaft at the rear of the carriage, the electric motor, mounted on and secured to the carriage, the intermediate shaft connected directly to the armature-shaft by slowing-down gearing and extending toward or into a gearing chamber or space below the armature and geared directly to the chain-driving shaft, one or more toothed wheels on the carriage for moving it, one or more racks on the bed engaging with the said toothed wheels, and two carriage-moving shafts extending from the said chamber or space below the motor for driving the said toothed carriage-moving wheels, and the means below the motor for imparting different speeds to the said two shafts, substantially as set forth.

In testimony whereof I affix my signature in presence of two witnesses.

HENRY B. DIERDORFF.

Witnesses:
CHARLES W. MILLER,
G. C. HORST.